(12) United States Patent
Hahn

(10) Patent No.: US 10,137,550 B2
(45) Date of Patent: Nov. 27, 2018

(54) DEVICE FOR STRIKING A TOOL SHANK AND METHOD OF REDUCING MACHINE TOOL RUN-OUT THEREWITH

(71) Applicant: Dale Hahn, Valencia, CA (US)

(72) Inventor: Dale Hahn, Valencia, CA (US)

( * ) Notice: Subject to any disclaimer, the term of this patent is extended or adjusted under 35 U.S.C. 154(b) by 137 days.

(21) Appl. No.: 15/263,167

(22) Filed: Sep. 12, 2016

(65) Prior Publication Data

US 2018/0071878 A1    Mar. 15, 2018

(51) Int. Cl.
  *B23Q 16/00* (2006.01)
  *B23Q 33/00* (2006.01)
  *B25D 1/16* (2006.01)
  *B23Q 23/00* (2006.01)

(52) U.S. Cl.
  CPC ............ *B23Q 16/00* (2013.01); *B23Q 23/00* (2013.01); *B25D 1/16* (2013.01)

(58) Field of Classification Search
  CPC ........... B23Q 16/00; B23Q 23/00; B25D 1/16
  See application file for complete search history.

(56) References Cited

U.S. PATENT DOCUMENTS

| | | | | |
|---|---|---|---|---|
| 2,560,864 A | * | 7/1951 | Hettinger | A21C 7/02 425/321 |
| 2,903,932 A | * | 9/1959 | McGonagill | B21D 1/06 173/121 |
| 3,029,512 A | * | 4/1962 | Saxton | B25D 5/02 30/277 |

\* cited by examiner

*Primary Examiner* — John C Hong
(74) *Attorney, Agent, or Firm* — Law Offices of Roland Tong, PC

(57) ABSTRACT

A device for striking a tool shank with a controlled force includes a tip configured to contact the shank, a plunger configured to be retracted a pullback distance from the tip and to exert a force on the tip proportional to the pullback distance when released, and a control mechanism configured to control the pullback distance. A method of reducing run-out in a machine tool comprises placing the tool in a tool holder, measuring the run-out using an indicator, identifying a high spot, manipulating the control mechanism of the striking device to select the force based on the shank diameter, and striking the shank on the high spot using the striking device.

14 Claims, 2 Drawing Sheets

FIG. 1

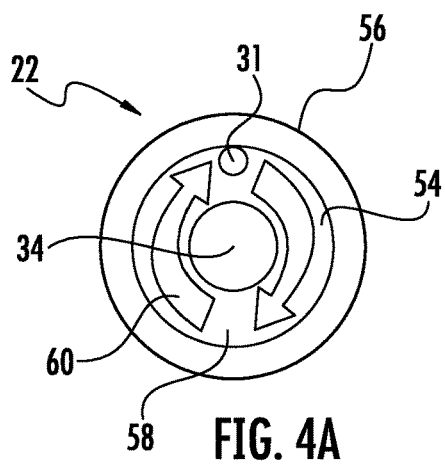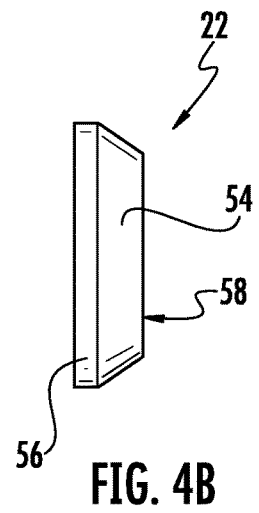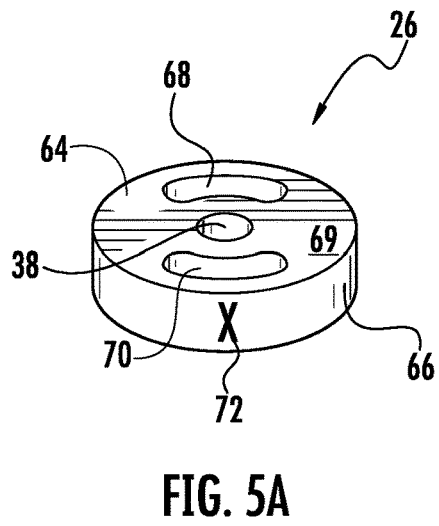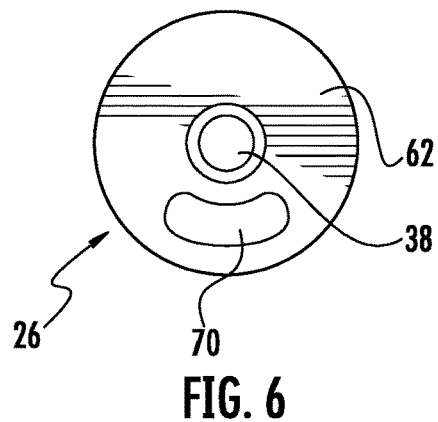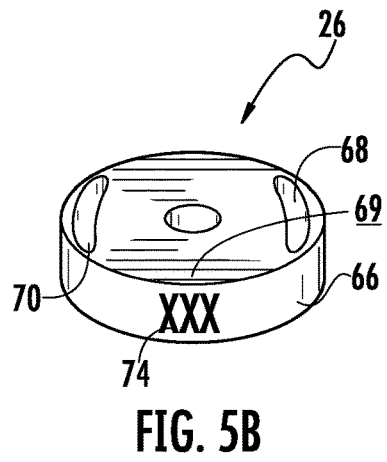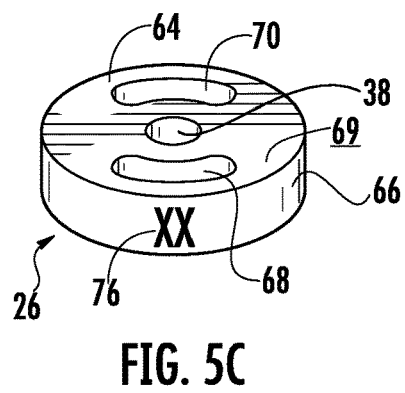

DEVICE FOR STRIKING A TOOL SHANK AND METHOD OF REDUCING MACHINE TOOL RUN-OUT THEREWITH

TECHNICAL FIELD

The present disclosure relates to machine tools and, more particularly, to a device for delivering a controlled force to the shank of a machine tool and a method of using the device to reduce run-out.

BACKGROUND

Machine tools, especially computer numeric controlled (CNC) machine tools, allow the automated manufacture of items having very precise dimensions. However, to achieve these precise dimensions, all of the components of the tools themselves must adhere to very close tolerances. Any inaccuracies in the alignment of various machine tool parts relative to one another, or deviations from flatness, roundness or other desired conditions, can reduce the precision of the manufactured products. In addition, misalignment of a shaft or other tool part relative to the main axis of the machine can cause vibrations and noise, and increase wear and tear on the part, ultimately shortening the lifespan of the tool. For these reasons, it is imperative that machine tool operators be able to accurately measure any errors in alignment, known as "run-out", and to reduce these errors to allowable levels.

Machine tool operators typically correct run-out by using an indicator, such as a dial indicator, to measure alignment errors at several circumferentially spaced apart locations on the shank of a tool. For instance, the operator may take measurements at 0°, 90°, 180°, 270°, and 360°, as indicated on the dial indicator. The operator then identifies the location of the greatest error, called the "high spot", and taps at this spot using a hammer and a piece of soft metal alloy (i.e. brass, copper, or aluminum) or similar tools, until the error falls within the allowed range. This method is suitable for large-diameter machine tools, but it often causes breakage in tools having very small diameter shanks, especially when these tools are made of relatively brittle materials. The above and other problems are addressed by this disclosure as summarized below.

SUMMARY

The present disclosure relates to a device for striking a tool shank with a controlled force. The device includes a tip configured to contact the shank, a plunger configured to be retracted a pullback distance from the tip and to exert a force on the tip proportional to the pullback distance when released, and a control mechanism configured to control the pullback distance.

In one embodiment of the disclosure, the tool shank has a longitudinal shank axis, and the tip of the striking device includes a distal end, a proximal end, and an elongated central portion having a longitudinal tip axis. The distal end of the tip has a cutout portion configured to maintain the shank in a centered position relative to the tip when the tip is placed against the shank with the tip axis extending perpendicular to the shank axis. The cutout portion may be V-shaped.

The striking device may include an elongated shaft extending proximally from the tip, wherein the plunger is mounted for sliding movement along the shaft. A base member may be secured to the proximal end of the shaft, and a compression spring may extend between the plunger and the base member. The spring may be configured to exert a force on the plunger which is proportional to the pullback distance. The control mechanism may include a stop rod extending proximally from the plunger, wherein the stop rod is configured to prevent further retraction of the plunger when the proximal end of the stop rod contacts the base member.

In one embodiment of the disclosure, the base member has a distal surface facing the plunger, the distal surface including a flat portion, an indented portion, and a through-hole. The plunger is mounted for rotation from a first position wherein the stop rod is aligned with the flat portion of the base member, to a second position wherein the stop rod is aligned with the indented portion of the base member, and a third position wherein the stop rod is aligned with the through-hole.

In one embodiment of the disclosure, the device is a handheld device, where the plunger is configured to be grasped between two fingers of one hand while the base member is supported against a thumb of the same hand.

The present disclosure also relates to a method of reducing run-out in a machine tool having a predetermined shank diameter. The method includes providing a striking device with a control mechanism configured to select and set a striking force based on the shank diameter; placing the tool in a tool holder; measuring the run-out using an indicator; identifying a high spot; manipulating the control mechanism of the striking device to select the force based on the shank diameter; and striking the shank on the high spot using the striking device.

In one embodiment of the disclosure, the method may be performed using a striking device wherein the striking device comprises: an elongated tip having a distal end and a proximal end; a shaft extending proximally from the proximal end of the tip, the shaft having a proximal end; a base member secured to the proximal end of the shaft; and a plunger configured to be retracted a pullback distance from the tip and to exert a force on the tip proportional to the pullback distance when released; and wherein the control mechanism is configured to allow selection and setting of the pullback distance from a plurality of pullback distances. In this embodiment, striking the shank may include grasping the plunger between two fingers of one hand while supporting the base member against a thumb of the same hand; retracting the plunger by drawing the two fingers toward the thumb; and releasing the plunger.

In one embodiment of the invention, the method may be performed using a device including a control mechanism having: a stop rod extending proximally from the plunger, the stop rod having a proximal end, a plurality of stop areas provided on the base member, each of the stop areas corresponding to a different shank diameter, wherein the stop rod is selectively alignable with each of the different stop areas. In this embodiment, manipulating the control mechanism may include aligning the stop rod with one of the stop areas. Striking the shank may include retracting the plunger as far as possible with respect to the aligned stop area, and releasing the plunger.

In one embodiment of the invention, the method may be performed using a device wherein the plunger is mounted for rotation about the shaft, and the base member comprises circular proximal and distal surfaces, wherein the stop areas are located at circumferentially spaced apart locations on the distal surface. In this embodiment, manipulating the control mechanism may include rotating the plunger until the stop rod is aligned with the stop area corresponding to the shank diameter. The stop areas may include a flat portion, an indented portion, and a through-hole, where the flat portion corresponds to a minimum pull-back distance, suitable for shanks having diameters within a range of predetermined minimum values; the indented portion corresponds to an intermediate pull-back distance suitable for shanks having diameters within a range of predetermined intermediate values; and the through-hole corresponds to a maximum pull-back distance suitable for shanks having diameters within a range of predetermined maximum diameters.

BRIEF DESCRIPTION OF THE DRAWINGS

FIG. 4A is substantially a proximal view of the plunger of the striking device shown in FIGS. 1 and 2.

FIG. 4B is substantially a side view of the plunger shown in FIG. 4A.

FIG. 5A is a perspective view of the bottom of the base of the striking device shown in FIGS. 1 and 2.

FIG. 5B is a view similar to FIG. 5A, rotated 90 degrees clockwise.

FIG. 5C is a view similar to FIG. 5A, rotated 180 degrees.

FIG. 6 is a top view of the base shown in FIG. 5A.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
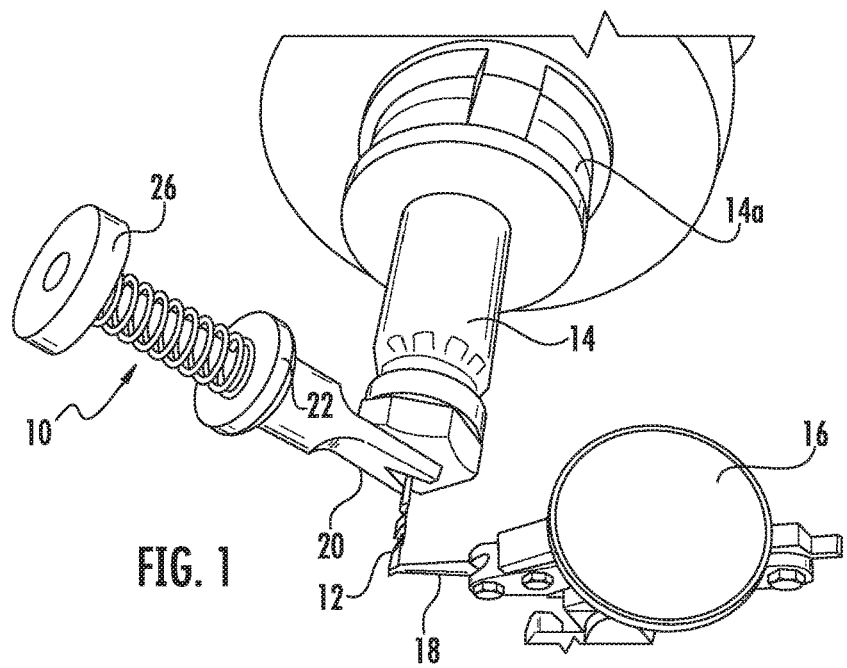
FIG. 1 is a perspective view showing a striking device according to the present disclosure being used to reduce the run-out of a drill bit, reamer, form tool or related cutting implement.

FIG. 1 shows a striking device according to the present disclosure, indicated in its entirety by the numeral 10. The device 10 is being used to reduce the run-out in a drill bit, reamer, form tool or related cutting implement 12 mounted in a tool holder 14 and spindle 14a. Misalignment between the tool holder 14 and the implement 12 is measured by a dial indicator 16 having a probe or tip 18 contacting the implement 12.

Figure 2:
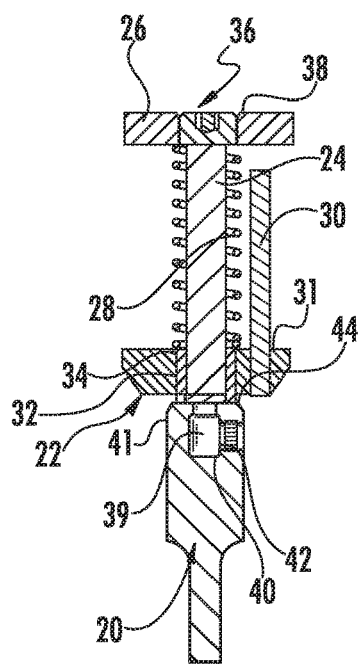
FIG. 2 is a substantially a longitudinal sectional view through the striking device of FIG. 1.

Referring to FIG. 2, the striking device 10 includes a tip 20 configured to contact the implement 12, and a plunger 22 configured to deliver a force to the tip 20. The plunger 22 is mounted for sliding movement along, and rotation about, a shaft 24 that extends proximally from the tip 20, in the direction of a base member 26 secured to the distal end of the shaft 24. A compression spring 28 carried by shaft 24 extends between the plunger 22 and the base member 26. A stop rod 30 extends proximally from the plunger 22, in a direction parallel to the shaft 24. The stop rod 30 may be in the form of a dowel press-fit into a hole 31 in plunger 22.

Tip 20, plunger 22, shaft 24, base member 26, spring 28, and stop rod 30 are preferably made from metallic materials. In one embodiment, tip 20, plunger 22, and base member 26 may be formed from a first material such as brass, while shaft 24, spring 28, and stop rod 30 may be formed from a second material such as steel.

The shaft 24 may comprise the shoulder portion of a shoulder screw extending through a drill bushing 32 carried in a central opening 34 in plunger 22. The head 36 of the shoulder screw may be press-fit within a hole 38 formed through base member 26. The threaded distal end 39 of the shoulder screw may be received in a threaded bore 40 in the proximal end 41 of tip 20, and held in place by a set screw 42. An O-ring 44 may be provided between plunger 22 and proximal end 40 of tip 20 to reduce the impact of the plunger 22 against the tip 20.

Figure 3A:
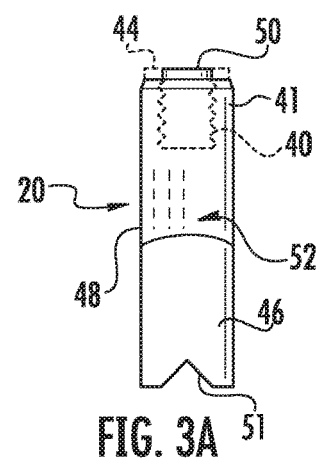
FIG. 3A is substantially a front view of the tip of the striking device shown in FIGS. 1 and 2.
Figure 3B:
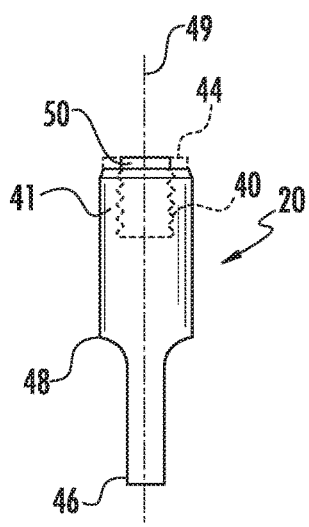
FIG. 3B is substantially a side view of the tip shown in FIG. 3A.

FIGS. 3A and 3B show the tip 20 in greater detail. The tip 20 includes proximal end 41, distal end 46, and intermediate portion 48, which defines a longitudinal tip axis 49. Proximal end 41 is generally cylindrical and includes a boss 50 through which threaded bore 40 extends. The boss 50 may be surrounded by O-ring 44. Proximal end 41 may also include engraved or imprinted indicia 52, which may aid an operator in properly using and setting the device 10. Distal end 46 is generally flat, and has a smaller cross-sectional area than proximal end 41. A cut-out portion, such as, for instance, a V-shaped notch 51, is formed in the center of the distalmost portion of the distal end 46. The V-shaped notch 51 may define an angle of about 90 degrees. Intermediate portion 48 is an elongated transitional area between proximal end 41 and distal end 46, and is shown here to include a gently curved convex area, although in some embodiments the transition could be either more or less abrupt.

Plunger 22, best seen in FIGS. 4A and B, includes a distal portion 54 and a proximal portion 56. Proximal portion 56 may be cylindrical, and distal portion 54 may be in the form of a truncated cone. The circular distal surface 58 of distal portion 54 may include indicia such as arrows 60.

Base member 26, best seen in FIGS. 5A-5C and 6, includes a proximal surface 62, distal surface 64, and a side wall 66. The distal surface 64 includes an arcuate indented portion 68 that subtends an angle of about 60 degrees, and an arcuate through-hole 70 that is located diametrically opposite indented portion 68 and also subtends an angle of about 60 degrees. A flat portion 69 is located between arcuate indented portion 68 and through-hole 70. Side wall 66 includes markings 72, 74, 76 aligned with the through-hole 70, the indented portion 68, and the flat portion 69, respectively.

Markings 72, 74, 76 may be symbols having a key which is provided by the indicia 52 on tip 20. For instance, in the illustrated embodiment, the through-hole 70 is aligned with the symbol X, as shown in FIG. 5A, while the flat portion 69 is aligned with the symbol XXX, as shown in FIG. 5B, and the indented portion 68 is aligned with the symbol XX, as shown in FIG. 5C. By referring to the indicia 52 on tip 20, as seen in FIG. 3A, the operator can determine that the symbol X corresponds to a tool shank diameter in a first range, such as 0.090-0.156 inches; the symbol XX corresponds to a tool shank diameter in a second range, such as 0.050-0.089 inches; and the symbol XXX corresponds to a tool shank diameter in a third range, such as 0.040-0.049 inches.

An example of a method of using the device 20 to reduce run-out in a tool will now be described. First, a tool such as implement 12 is placed in a tool holder 14 (FIG. 1). Next, an indicating device such as dial indicator 16 is used to measure run-out at several angularly spaced locations; for instance, at 0°, 90°, 180°, 270°, and 360° along the circumference of the tool. After identifying the high spot (i.e. the location where run-out is greatest), the implement 12 is rotated so that the high spot is on top. The operator then places the tip 20 of striking device 10 against the implement 12, such that the tool is held in a centered position within the cut-out portion 51 of the tip 20, and the longitudinal axis 49 of the tip 20 extends generally perpendicularly to the longitudinal axis of the tool 12. Prior to, or just after, positioning the tip 20 against the bit 12, the operator rotates plunger 22 until the stop rod 30 is aligned with the correct marking for the tool being indicated. For instance, if the implement 12 has a diameter of 0.062 inches, the operator rotates plunger 22 in the direction indicated by arrows 60 until stop rod 22 is aligned with the symbol XX, which corresponds a shank diameter in the range of 0.050-0.089 inches. When the stop rod 30 is properly aligned, the operator may grasp the plunger 22 between two fingers of one hand and place the thumb of the same hand on the base member 26, and then retract the plunger 22 by drawing the two fingers towards the thumb. After retracting the plunger 22 as far as possible, the operator releases the plunger 22, causing the plunger 22 to return to its initial position and to exert a force on the tip 20 which is proportional to the distance traveled by the plunger 22. The operator then re-measures the run-out using the dial indicator 16, and if necessary, repeats the process as many times as needed until the run-out is within allowable levels.

A practitioner of ordinary skill will recognize that the force exerted by tip 20 on tool 12 is determined by the spring constant of spring 28 and the amount of distance the spring 28 is retracted, which is referred to herein as the "pullback distance." When the stop rod 30 is aligned with the flat portion 69 of the base member 26, the pullback distance is minimal, resulting in minimal force on the tool. This makes it possible to minimize run-out on extremely small diameter, brittle tools, without risk of breaking the tools. When the stop rod 30 is aligned with the indented portion 68 of the base member, the pullback distance is increased by an amount equal to the depth of the indentation, resulting in a slightly greater force that is effective for slightly thicker tools. When the stop rod 30 is aligned with through-hole 70, the plunger 26 can be retracted as far as spring 28 allows, resulting in a still greater force that is effective for even thicker tools. The striking device 10 can be designed to work for tools having a wide variety of shank diameters, simply by choosing a spring 28 with an appropriate spring constant, and selecting the length of stop rod and the depth of indented portion 68 accordingly. Furthermore, the number of settings corresponding to different diameters can be increased by adding more indented portions having depths different than indented portion 68.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device for striking a tool shank, comprising:
   a tip configured to contact the shank;
   a plunger configured to be retracted a pullback distance from the tip and to exert a force on the tip proportional to the pullback distance when released; and
   a control mechanism configured to control the pullback distance.

2. A device according to claim 1, wherein the shank has a longitudinal shank axis, and wherein the tip comprises:
   an elongated central portion having a longitudinal tip axis;
   a distal end having cutout portion configured to maintain the shank in a centered position relative to the tip when the tip is placed against the shank with the tip axis extending perpendicular to the shank axis; and
   a proximal end facing the plunger.

3. A device according to claim 2, wherein the cutout portion is a V-shaped cutout.

4. A device according to claim 1, further comprising:
   an elongated shaft extending proximally from the tip, wherein the plunger is mounted for sliding movement along the shaft, the shaft having a proximal end;
   a base member secured to the proximal end of the shaft; and
   a compression spring carried on the shaft and extending between the plunger and the base member, wherein the spring is configured to exert said force on the plunger.

5. A device according to claim 4, wherein:
   the control mechanism comprises a stop rod extending proximally from the plunger, the stop rod having a proximal end; and
   wherein the stop rod is configured to prevent further retraction of the plunger when the proximal end of the stop rod contacts the base member.

6. A device according to claim 5, wherein:
   the base member has a distal surface facing the plunger, the proximal surface including
   a flat portion,
   an indented portion, and
   a through-hole; and
   the plunger is mounted for rotation from a first position wherein the stop rod is aligned with the flat portion of the base member, to a second position wherein the stop rod is aligned with the indented portion of the base member, and a third position wherein the stop rod is aligned with the through-hole.

7. A device according to claim 1, wherein the control mechanism is configured to allow selection of said pullback distance from a plurality of different pullback distances.

8. A handheld device for striking a small diameter tool shank during a machine tool indicating process, the device comprising:
   an elongated tip having a distal end and a proximal end;
   a shaft extending proximally from the proximal end of the tip, the shaft having a proximal end;
   a base member secured to the proximal end of the shaft;
   a plunger configured to be retracted a pullback distance from the tip and to exert a force on the tip proportional to said pullback distance when released; and
   a control mechanism configured to allow selection and setting of said pullback distance from a plurality of pullback distances.

9. A handheld device according to claim 8, wherein the plunger is configured to be grasped between two fingers of one hand while the base member is supported against a thumb of the same hand.

10. A handheld device according to claim 8, wherein:
    the tool shank has a shank axis;
    the tip has a tip axis; and:
    the distal end of the tip includes a cutout portion configured to maintain the shank in a centered position relative to the tip when the tip is placed against the shank with the tip axis extending perpendicular to the shank axis.

11. A handheld device according to claim 8, further comprising:
a compression spring carried on the shaft and extending between the plunger and the base member, wherein the spring is configured to exert said force on the plunger.

12. A handheld device according to claim 8, wherein the control mechanism comprises:
a stop rod extending proximally from the plunger;
a plurality of stop areas provided on the base member, each of the stop areas corresponding to a different pullback distance;
wherein the stop rod is selectively alignable with each of the different stop areas.

13. A handheld device according to claim 12, wherein:
the plunger is mounted for rotation about the shaft; and
the base member comprises circular proximal and distal surfaces, wherein the stop areas are located at circumferentially spaced apart locations on the distal surface.

14. A handheld device according to claim 13, wherein the stop areas comprise:
a flat portion of the distal surface, the flat portion corresponding to a minimum pullback distance;
an indented portion of the distal surface, the indented portion corresponding to an intermediate pullback distance; and
a through-hole extending through distal and proximal surfaces, the through-hole corresponding to a maximum pullback distance.

* * * * *